United States Patent [19]

Leib

[11] Patent Number: 5,642,440
[45] Date of Patent: Jun. 24, 1997

[54] SYSTEM USING ERGODIC ENSEMBLE FOR IMAGE RESTORATION

[75] Inventor: Kennth G. Leib, Wantagh, N.Y.

[73] Assignee: Grumman Aerospace Corporation, Los Angeles, Calif.

[21] Appl. No.: 351,707

[22] Filed: Dec. 8, 1994

[51] Int. Cl.⁶ .................. G06F 17/14; G06K 9/36
[52] U.S. Cl. .................. 382/255; 382/192; 382/229; 382/280; 382/286
[58] Field of Search ................ 356/237, 371; 382/210, 211, 228, 229, 255, 280, 286, 191, 192

[56] References Cited

U.S. PATENT DOCUMENTS

| | | | |
|---|---|---|---|
| 3,805,596 | 4/1974 | Klahr | 73/67.85 |
| 3,969,017 | 7/1976 | Dammann | 350/162 |
| 4,275,265 | 6/1981 | Davida et al. | 178/22.09 |
| 4,329,020 | 5/1982 | Dallas et al. | 350/162 |
| 4,735,486 | 4/1988 | Leib | 350/162.13 |
| 5,075,896 | 12/1991 | Wilcox et al. | 382/228 |
| 5,384,863 | 1/1995 | Huttenlocher et al. | 382/203 |
| 5,453,844 | 9/1995 | George et al. | 382/280 |

OTHER PUBLICATIONS

Stroke, Optical Computing, Dec. 1972, pp. 24–41. IEEE Spectrum.

Primary Examiner—Joseph Mancuso
Assistant Examiner—Timothy M. Johnson
Attorney, Agent, or Firm—Terry J. Anderson; Karl J. Hoch, Jr.

[57] ABSTRACT

Established text characteristics help generate a random ergodic ensemble of characters constituting a random text image. The image is scaled in accordance with different optical parameters such as lens position, focal length, and change in focal length. The test image is printed or displayed so that a Fourier Transform of the image can be taken and recorded. The recorded image is printed and constitutes an inverse filter. The inverse filter is positioned in an inverse Fourier Transform. An actual image (blurred text) undergoes a Fourier Transform and is then filtered by the inverse filter positioned at the inverse Fourier plane. The resulting filtered image then undergoes an inverse Fourier Transform so as to restore or at least greatly enhance the blurred image.

5 Claims, 6 Drawing Sheets

|       | B>S          | B=S      | B<S          |
|-------|--------------|----------|--------------|
| T>S   | f−df<br>f−df | f−df<br>f | f−df<br>f+df |
| T=S   | f<br>f−df    | f<br>f    | f<br>f+df    |
| T<S   | f+df<br>f−df | f+df<br>f | f+df<br>f+df |
*FIG. 6A*
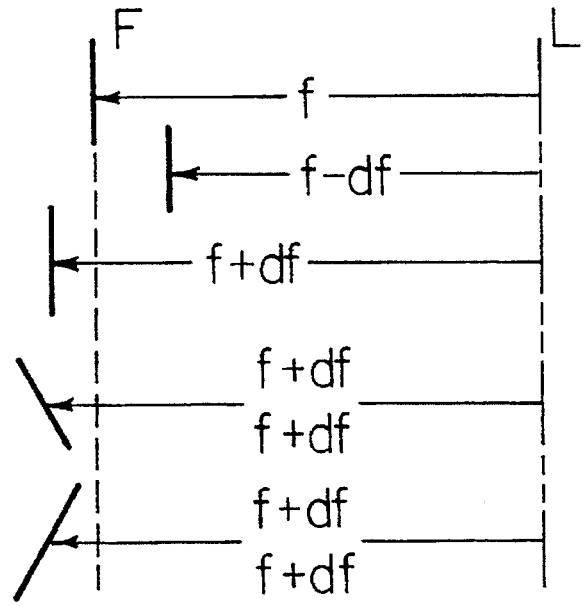
*FIG. 6B*
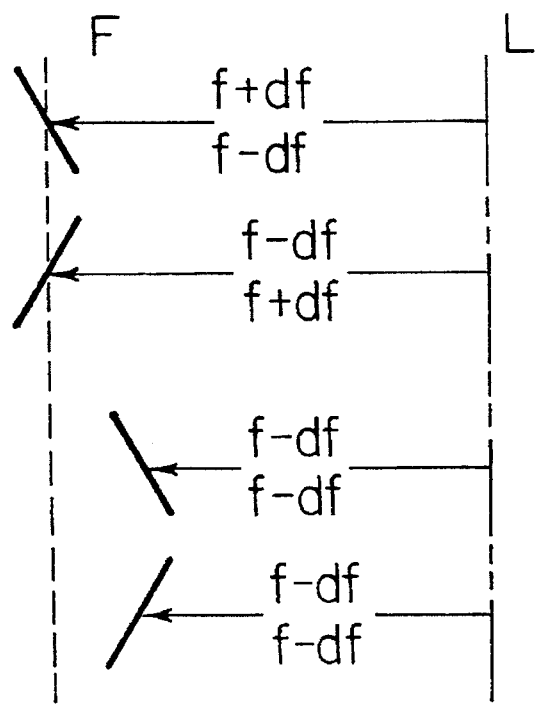
*FIG. 6C*

SYSTEM USING ERGODIC ENSEMBLE FOR IMAGE RESTORATION

RELATED CO-PENDING APPLICATION

The following co-pending application is related to the present invention: application Ser. No. 08/522,112, by the same inventor as the present application, entitled "Blurred Image Reading by Hi-Probability Word Selection," and assigned to the same assignee as the present application.

FIELD OF THE INVENTION

BACKGROUND OF THE INVENTION

In some aspects of military work, access to blurred messages occurs. The need to read these occasional anomalies is obvious but present means often require time-consuming digital procedures using the various algorithms such as LaPlacian, high-pass filtering and others currently available.

One of the "standard" approaches of both optical and digital is to use an inverse filter. That is, in an optical system or its digital equivalent, one takes a Fourier Transform of the blurred image and places a filter whose character is to be determined in the Fourier or spatial frequency plane. If properly designed, the filter upon reimaging (taking another Fourier Transform) will bring a degree of restoration to the image, rendering it understandable. That means perfect restoration (in one or more operations) is not necessary, or sometimes not even possible. The basis of restoration is summarized in the following sequence of equations:

$g(x_2, y_2)$ = complex amplitude of image $h(x_1, y_1; x_2, y_2)$ = impulse response $f(x_1, y_1)$ = complex amplitude of object $g = f * h$ $G = F\ H$ $G\ H^{-1} = F\ H\ H^{-1}$ $G\ H^{-1} = F$ (Restored image)

where the capital letters refer to the Fourier Transforms of the corresponding functions and (*) denotes convolution. The result, in principle, is the inverse filter which, when inserted in the Fourier plane, should provide image restoration.

In FIGS. 1A and 1B we can see pictorially what is done. In FIG. 1A we have the absolute value of amplitude for an image with the modulus of the inverse filter shown in FIG. 1B. In the simplest case the first and third orders would have negative phase and the second and fourth, positive. In reality the spectrum amplitude and phase are much more complicated in distribution throughout the spatial frequency domain.

Much work has been and is being done principally in the digital analysis world with such techniques as contrast enhancement routines, constrained least squares filtering, extended filters, optimizing mean square error filters, and other extensions or alterations of the Wiener filter. The work also includes the standard digital fare like high-pass filtering with convolution matrices, establishing median filters wherein each pixel is processed by giving it the median of its eight neighbors (in a 3×3 matrix) and Kalman filtering with various kernels. In others, adaptive filtering is performed. This is a technique of performing a large number of iterations of, in sequence, the Fourier Transform, assessment, modification, inverse transform, assessment, Fourier Transform, modification, and so forth. A priori knowledge or good guessing drive the modifications in the sequence. In some iterative routines, the investigator assumes that the degration must lie between or within a set of parameters and uses these to make appropriate modifications based upon this.

BRIEF DESCRIPTION OF THE PRESENT INVENTION

The present invention approaches the problem of restoration somewhat differently. For example, in several prior art approaches, a source of deblurring is often guessed at and becomes the basis of restoration routines. In this invention it is assumed that the structure and frequencies of occurrence of the elements of the image are known, i.e., the elements that make up the text. We assume by whatever means it takes that the following information is or can be made available by a sequence of measurements, some described here:

Alpha-numeric origins
   Letter frequency
   Probability of occurrence
   Font and point values
Line spacing data
   Orientation determinant
   Absolute value, e.g., 4.25 mm.
Recording parameters
   Focal length
   Film type
   f/#
   Exposure time
Text Structure
   #words, sentences, paragraphs
   #letters/word
   word distribution
   #Capital letters It has also been demonstrated that we can perform operations (to be described) that can measure the line spacing and from the data determine image position and/or the degree of keystoning (the data is not orthogonal to the recording axis when captured).

BRIEF DESCRIPTION OF THE FIGURES

The above-mentioned objects and advantages of the present invention will be more clearly understood when considered in conjunction with the accompanying drawings, in which:

FIG. 6A is a matrix of focal conditions governing the production of a controlled blurred image;

FIG. 6B is a first comparative series of conditions of object position;

FIG. 6C is a second comparative series of conditions of object position;

DETAILED DESCRIPTION OF THE INVENTION

The invention is a system for capturing a blurred image on a camera, making specific measurements and, with the results of measurements and a priori input information, generating a specific inverse filter for restoring the blurred image.

All a priori information is based upon the constancy (in our case, the English) language, i.e., the a priori inputs are determined because of this constancy. Other languages have a constancy but the a priori inputs would be different. For example, German, with its propensity for compound words, has longer words on the average and other a priori inputs would be somewhat different from English but be constant for the German language.

A blurred image can be looked at as the convolution of the unblurred image and the blur function (and sometimes additive noise). Thus, if one were to multiply the blurred function in the Fourier plane by the inverse of the blur function, restoration would be achieved. It is a simple idea; but there are many ramifications such as film and camera characteristics, motion, and focal conditions, shutter functions and in the case of text, the intraline interference. The many factors involved make the determination of the amplitude and phase of the inverse filter a difficult and unsure process.

The restoration invention involves the generation of a prescribed text used to make a filter based upon the characteristics of the text. Thus, one must know something about the text. For most applications, a priori knowledge of the font, point size, and line spacing are known. More comments about these factors are given later. Measurements are then made of text samples and this data is used to generate a random sample of sufficient size so that the optical Fourier Transform can be taken. Then, the amplitude and phase as a function of spatial frequency are used to generate an amplitude or phase-only filter. The latter can be digitized and made in either silver halide or a high efficiency dichromated gelatin or photopolymer. In the latter case it is referred to as a binary-phase-only-inverse-filter (BPOIF), a subject of current technical interest.

The technique for generating the filter is based upon the fact that the English language is ergodic, i.e., an infinite text message has certain properties that are similar to those of an infinite number of analyzed short text messages. In general a blurred and unknown message is unknown but we do know its general characteristics—font, point value, etc. The invention is based upon using the known factors about the text and language to generate the optimum filter; and if the message size is sufficient, the filter is applicable.

Figure 2:
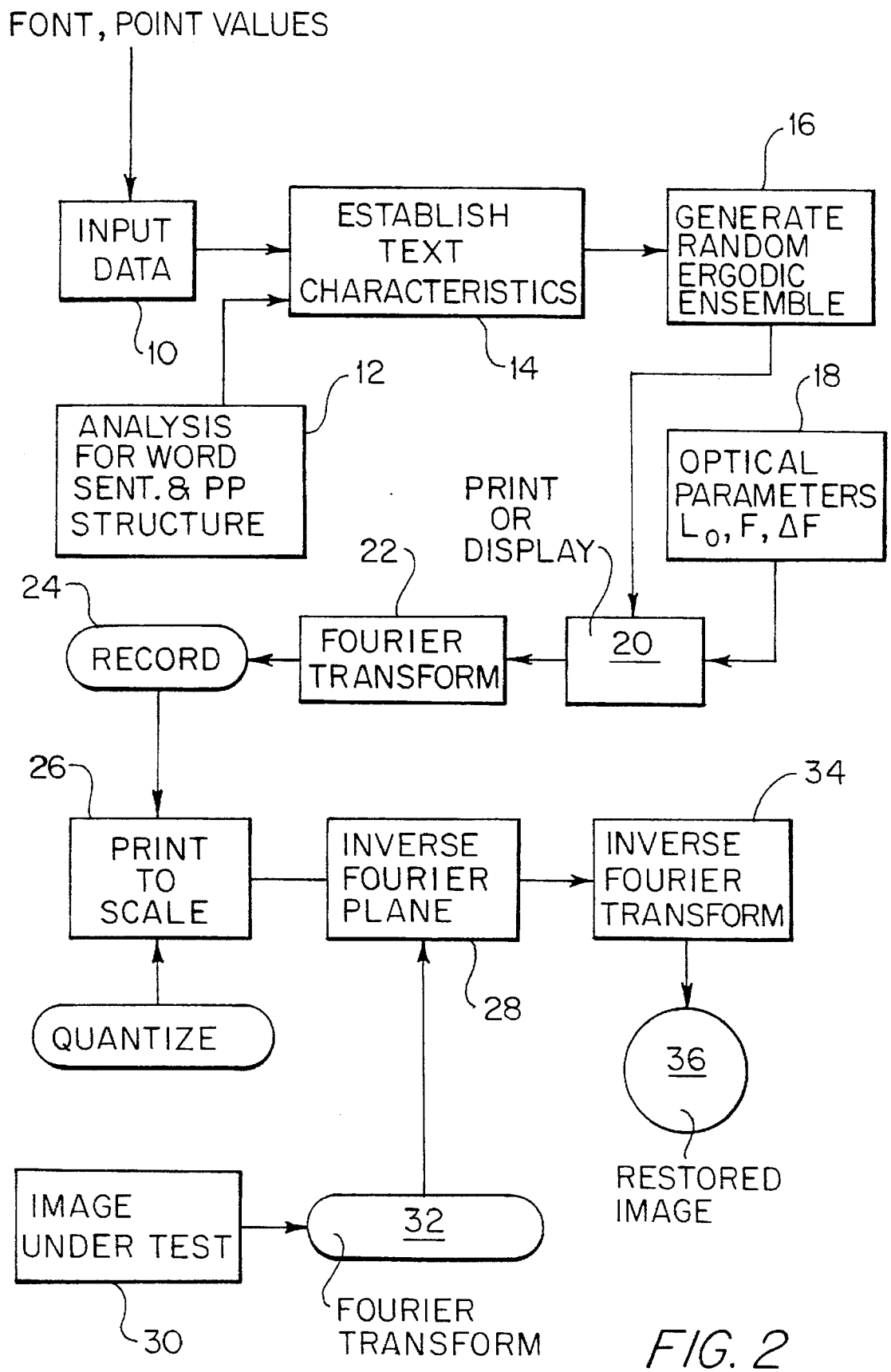
FIG. 2 is a schematic illustration of the general sequence for restoring an image in accordance with the present invention.

FIG. 2 is a schematic of the generalized method in accordance with the present invention. For various known text images, input data is provided at 10 which concerns such parameters as font and their point sizes. As discussed in this specification, analyses exist for word, sentence, and paragraph structure in terms of frequency of occurrence. This is indicated at 12. The input data and the structure analysis establishes text characteristics as denoted by reference numeral 14. These characteristics may generate a random ergodic ensemble (random reference image) as indicated at 16. Such a test image may be printed or displayed at 20 for various optical parameters (18) such as image distance, focal length, and changes in focal length. For any particular set of optical parameters, the printed or displayed image undergoes a Fourier Transform at 22. The Fourier Transform is recorded at 24 and printed to scale as an inverse filter at 26. The resulting filter is positioned at an inverse Fourier plane (28). A particular image under test (30) undergoes a Fourier Transform at 32 and the resulting transformed image is projected onto the inverse Fourier plane where the inverse filter exists. By subjecting the resulting filtered image to an inverse Fourier Transform at 34, a restored image 36, or at least a greatly enhanced image, is obtainable.

Figure 1A:
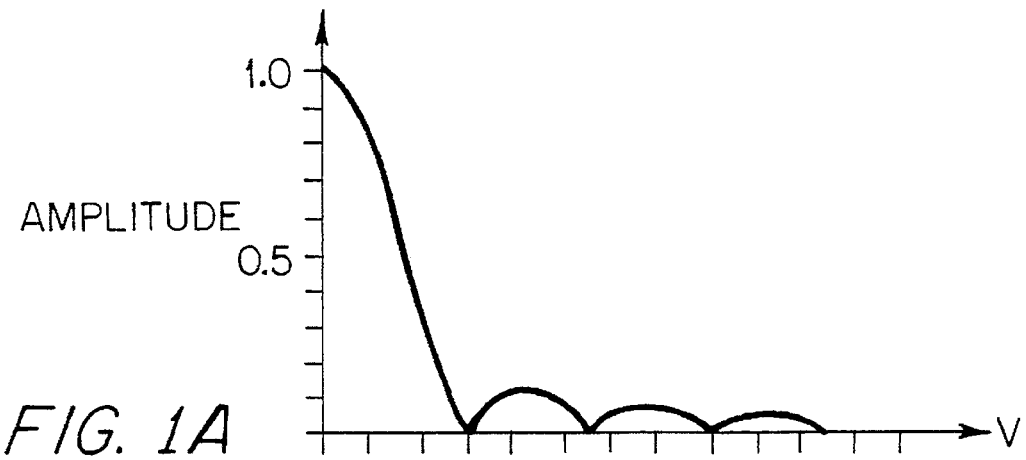
FIG. 1A is a plot of the absolute value of amplitude for an image.
Figure 1B:
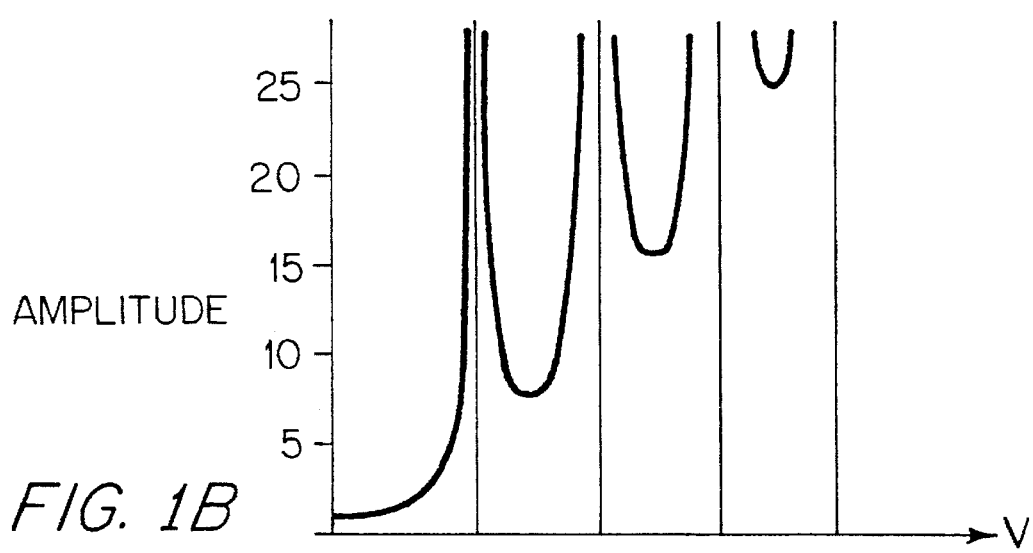
FIG. 1B is a plot of a modulus of an inverse filter corresponding to the image of FIG. 1A.
Figure 3:
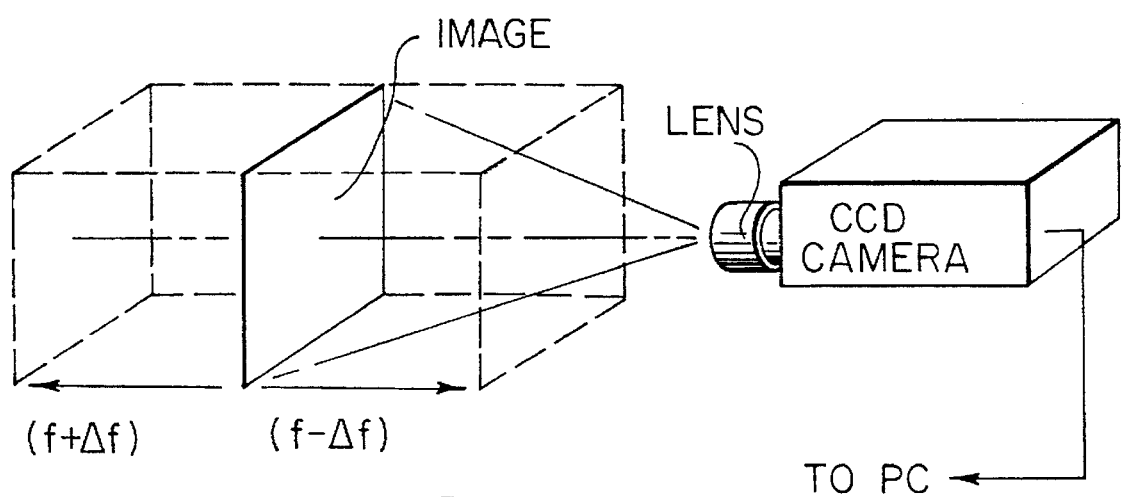
FIG. 3 is a schematic illustration of a camera relative to a movable image.

FIG. 3 illustrates the setup when the original blurred image is captured, perhaps in an ideal way. The image is shown at its in-focus position with the dotted lines illustrating the region within which the image might be located at some other time. The extent of the position variation is $f=\pm\Delta f$, where f represents the focal position of the pickup system consisting of the CCD camera and its associated lens. A generic PC is used to capture and process the image under test.

Figure 4A:
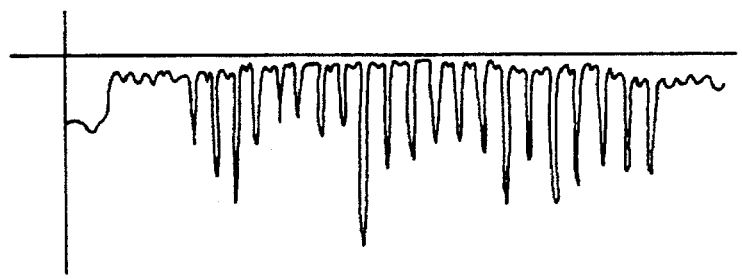
FIG. 4A is a plot of a line spacing scan wherein the image is maintained perpendicular to the optical axis.
Figure 4B:
FIG. 4B is a plot similar to that of FIG. 4A but wherein the image is tilted 18°.

However oriented, two measurements would be conducted. These would be scans perpendicular to the apparent line orientation remembering that a test may be necessary to obtain the orientation as a blurred text may not easily be oriented by eye. When oriented, several measurements are made so as to take an average line spacing. The scans run through various distributions of blurred text so line spacing is not obtainable in one arbitrary scan. In a similar way, we scan along the center of each line in a prescribed sequence. The first set of measurements yields the line spacing under various $\Delta f$ conditions as well as keystoning conditions. Keystoning occurs when the image tilts relative to an optical axis. FIGS. 4A and 4B show the result of line spacing scans in which first, the image is perpendicular to the optical axis, and second, when it is tilted 18°. Note should be made of the uniform spacing for the 0° orientation and the variability of line spacing with the keystoned orientation. In fact, one can use this measurement to determine the degree of keystoning. In a second set of controlled scans, we can move the image between the limits of $2\Delta f$ of FIG. 3 and at each position make a scan. We would obtain for the data the curve shown in FIG. 5 relating normalized focus position to the line scan. Finally, if we combine the two conditions, line scan for tilt and no-tilt, with $\Delta f$, we obtain the matrix of focal conditions of FIG. 6A with the conditions necessary to obtain the matrix shown in FIG. 6B. In FIG. 6A, the terms T, B, and S refer to the top of the scan, the bottom, and the standard (a priori known) scan. The latter is the same as at the center of a scan when the image is located at focus, the F position in FIG. 6B. In this invention the process to obtain matrix elements can be achieved by the representative logic plan of FIG. 7. The latter figure and that of FIG. 6A should be considered together.

Figure 7:
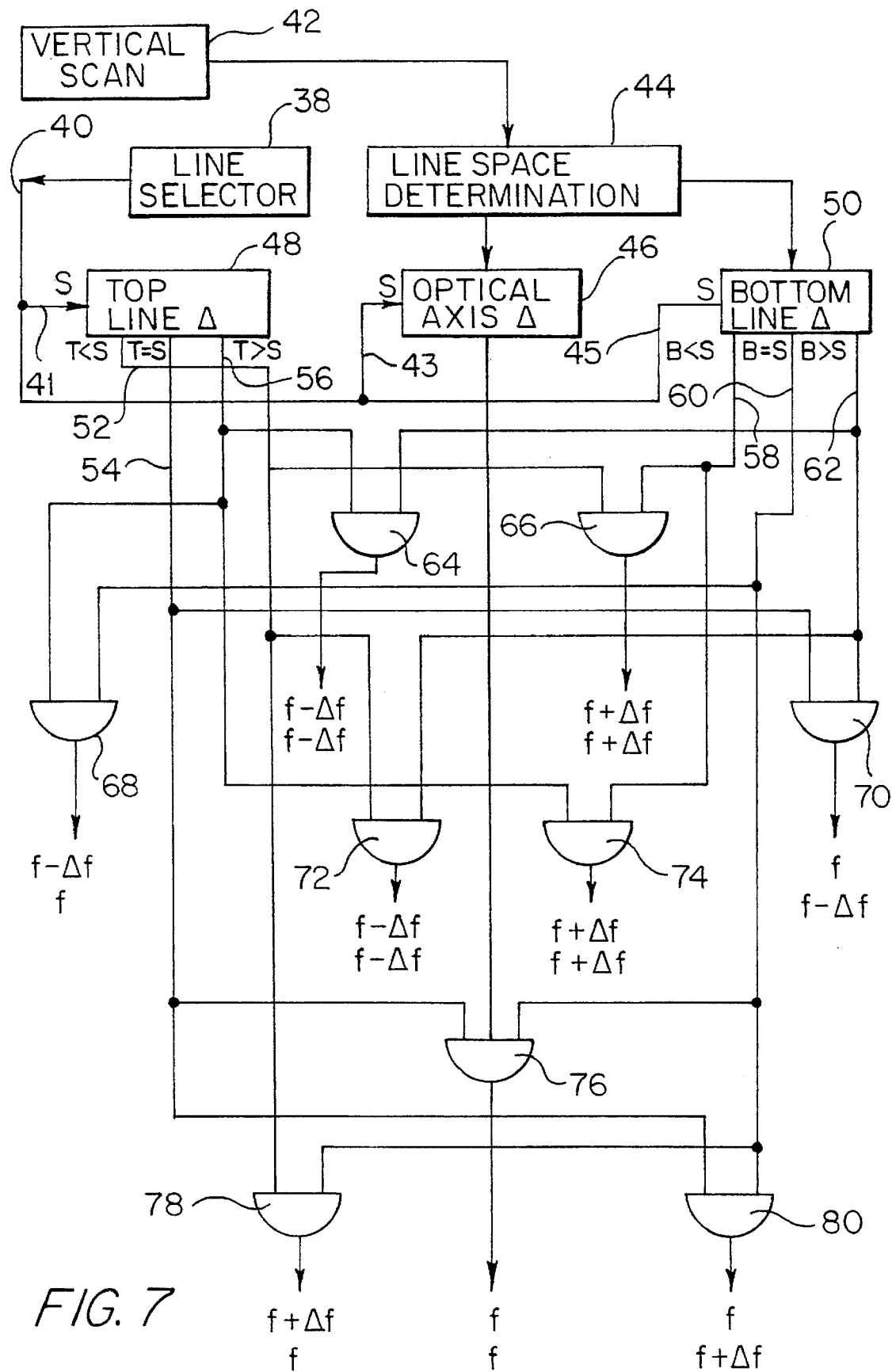
FIG. 7 is a logic diagram of a network for determining the angular orientation of a blurred image relative to an optical axis.

FIG. 7 is a logic diagram of a network for determining the angular orientation of a blurred image relative to an optical axis. A vertical scan of a blurred image is made by a camera and the data relative to each vertical scan is digitized at 42. The intervals between signals correspond to spaces between lines and this is determined at 44. A line selector 38 generates a standard line separation signal at output 40 which serves as an input to comparators 48, 46, and 50. The top line comparator 48 makes a comparison between the line spacing at a particular point along the vertical scan and compares it with the standard. The results of the comparison will indicate whether the real time line spacing is less than the standard (52), equal to the standard (54), or greater than the standard (56). The optical axis comparator 46 simply compares the real time line-space determination from 44 relative to the standard value at 43 and a binary 1 or 0 will result at its output.

A bottom line comparator 50 establishes the line-space determination at the bottom of a vertical scan and makes comparisons relative to the standard value (at 45). Thus, unique outputs will result if the bottom line space is less than the standard value (58), equal to the standard (60), or greater than the standard (62).

A first level of AND gates 64 and 66 has inputs connected to the top and bottom line comparators 48 and 50, respectively. Their respective outputs indicate the focal length differential indicated in the figure which is correlatable to the matrix of focal conditions in FIG. 6A.

A second level of AND gates comprises 68 and 70 which compare the indicated comparisons of the top and bottom line comparators 48 and 50 for providing additional entries to the matrix of focal conditions.

A third level of AND gates 72 and 74 has their inputs connected to the top and bottom line comparators 48 and 50 as indicated in the figure so as to provide additional entries for the matrix of focal conditions. A final network of AND gates 78 and 80 has its inputs connected to still other output lines of the top and bottom line comparators 48 and 50 for establishing further entries in the matrix of focal conditions. An output from AND gate 76 signifies that a view along the optical axis is currently present.

Figure 8:
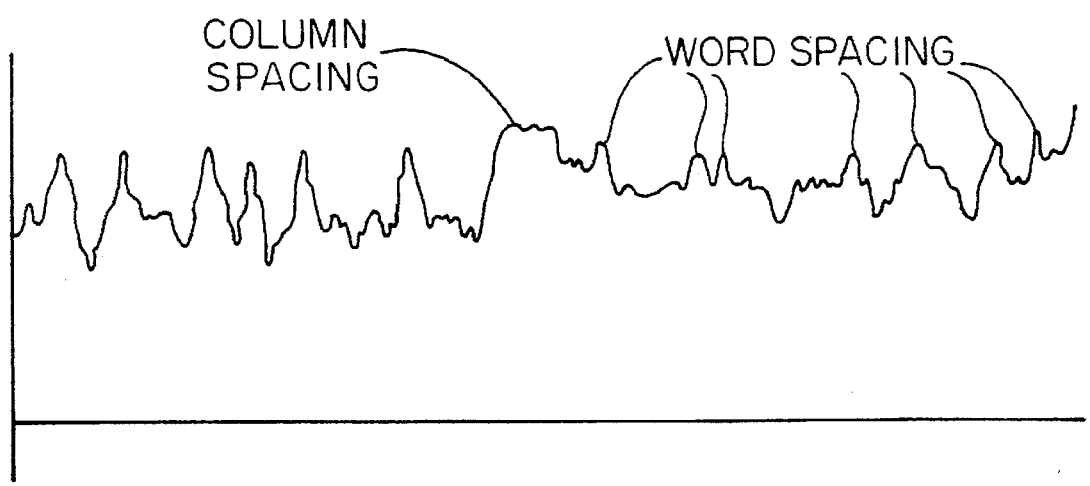
FIG. 8 is a profile illustration of a scan in which the word and column spacing can be determined.

The horizontal scan through the text lines yields data which enables the word size to be determined. FIG. 8 illustrates a scan in which the word and column spacing can be determined. In similar fashion sentence, column, and paragraph spacing can be determined.

Figure 5:
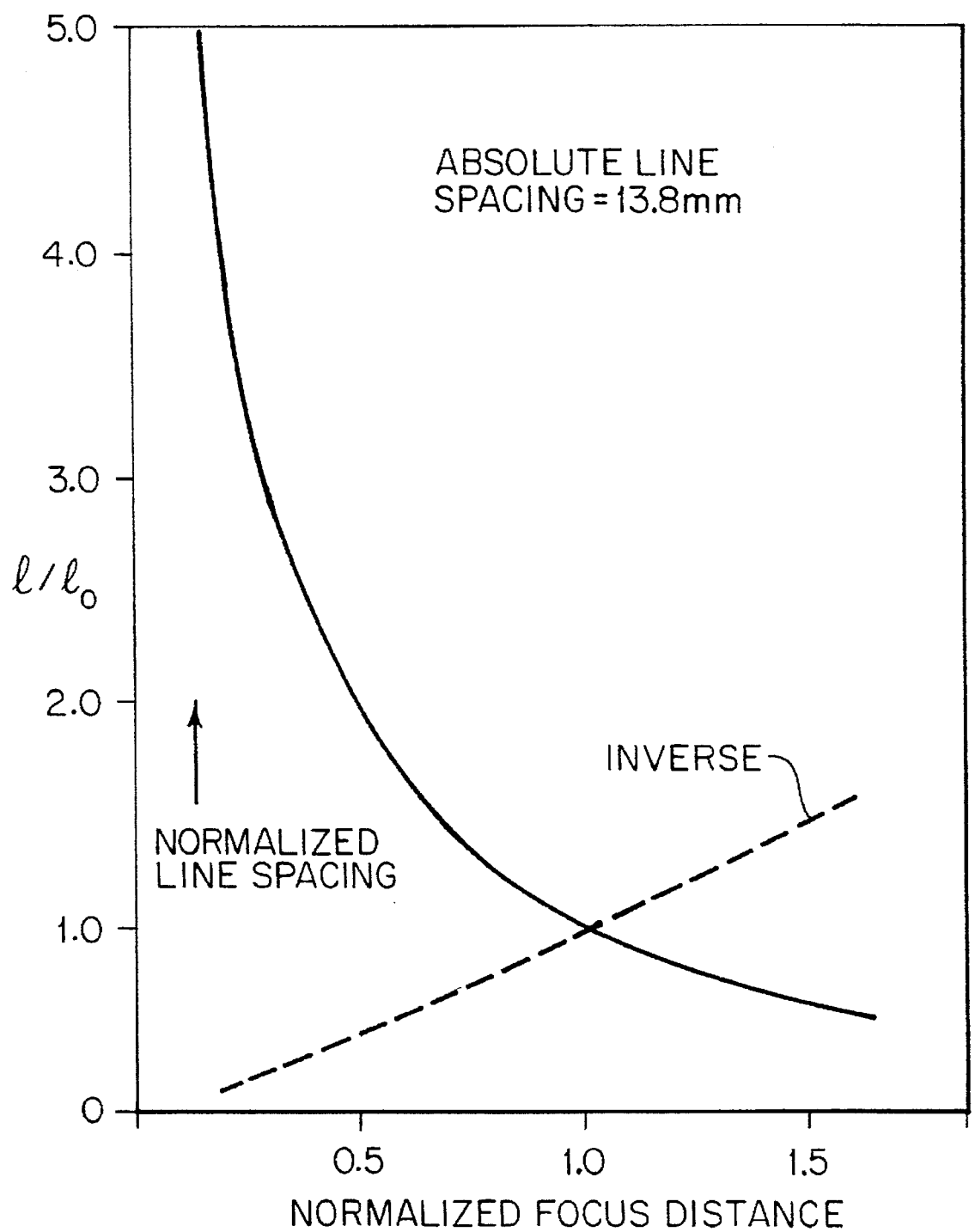
FIG. 5 is a plot relating normalized focus position to a line scan.

In a way that is similar to the line scan results graphically shown in FIG. 5, one may take a sequence of text line scans with the test image at various positions; measure the word, sentence, column, and paragraph spacings; and plot a curve of word space versus normalized focus position. This would yield an appropriate distribution. The results of such measurements coupled with those for line scan would then be used to determine corrections to an ergodic ensemble inverse filter because the test results could be compared with the unknown. In other words, the controlled blurring would be compared with the blind or unknown blurred image to effect corrections.

Once the random ergodic ensemble has been generated, it is used to generate a matrix of blurred conditions, + and −. After the blurred samples are generated, they are measured and compared with the "unknown" until the best match is achieved. This forms the basis of the first inverse filter and then with each restoration a less-defocussed sample is used for an inverse filter until gradually the inverse filter close to the clear text restores the imagery. The line space causing high frequency characteristics is incrementally restored to the proper line spacing. The ergodic ensemble provides the basis for restoring other information as well.

Finally, it has been stated that the ergodic ensemble inverse filter can be constructed in silver halide, dichromated gelatin or such materials as photopolymers available from duPont and Polaroid Corporations.

It should be understood that the invention is not limited to the exact details of construction shown and described herein for obvious modifications will occur to persons skilled in the art.

I claim:

1. A method for deblurring a text image comprising the steps:

providing data of parameters for different fonts having varying point sizes;

providing a priori data regarding text structure including average size of words, sentences, and paragraphs for a preselected language;

combining the data of parameter and a priori data to generate a random ergodic ensemble of text characters;

generating an image of the ensemble;

producing a Fourier transform of the ensemble image;

recording the Fourier transform of the ensemble image;

producing an image of the recorded Fourier transform which serves as an inverse filter;

positioning the inverse filter at an inverse Fourier plane;

producing a Fourier transform of an image under test;

projecting the Fourier transform of an image under test through the inverse filter;

subjecting an inverse filtered image under test to an inverse Fourier transform; and displaying an image under test after inverse Fourier transformation resulting in an enhancement of the image under test.

2. The method set forth in claim 1 wherein the a priori data is based upon constancy in a language and includes the average frequency of occurrence of all the letters in textual material written in a preselected language.

3. The method set forth in claim 1 wherein the a priori data includes the average distribution of word size in textural material written in a preselected language.

4. A method for deblurring a text image comprising the steps:

providing data of parameters for different fonts having varying point sizes;

providing a priori data regarding text structure including average size of words, sentences, and paragraphs for a preselected language;

combining the data of parameter and a priori data to generate a random ergodic ensemble of text characters;

subjecting the generated random ergodic ensemble to a plurality of optical parameters simulating variations of an optical system which views normal text;

generating an image of the ensemble;

producing a Fourier transform of the ensemble image;

recording the Fourier transform of the ensemble image;

producing an image of the recorded Fourier transform which serves as an inverse filter;

positioning the inverse filter at an inverse Fourier plane;

producing a Fourier transform of an image under test;

projecting the Fourier transform of an image under test through the inverse filter;

subjecting an inverse filtered image under test to an inverse Fourier transform; and displaying an image under test after inverse Fourier transformation resulting in an enhancement of the image under test.

5. The method set forth in claim 4 wherein the a priori data includes the average:

(a) frequency of occurrence of all the letters in textual material written in a preselected language; and (b) distribution of word size in textual material written in the language.

\* \* \* \* \*